United States Patent [19]
Uehara et al.

[11] Patent Number: 5,622,805
[45] Date of Patent: Apr. 22, 1997

[54] NON-CONTACT INK DEVELOPING METHOD USING WATER-REPELLENT SURFACE

[75] Inventors: Yasuhiro Uehara; Masahiro Sato; Yuji Kobayashi; Yasuhiro Kusumoto; Tsutomu Sugimoto; Yoshio Shoji, all of Ebina, Japan

[73] Assignee: Fuji Xerox Co., Ltd., Tokyo, Japan

[21] Appl. No.: 522,541

[22] Filed: Sep. 1, 1995

Related U.S. Application Data

[63] Continuation of Ser. No. 137,793, Oct. 19, 1993, abandoned.

[30] Foreign Application Priority Data

Apr. 9, 1993 [JP] Japan .................................. 5-083045

[51] Int. Cl.⁶ .......................... G03G 9/00; G03G 15/10; B41J 2/06; B41J 2/01
[52] U.S. Cl. .............................. 430/117; 430/118; 347/55; 347/103; 399/237
[58] Field of Search ...................... 347/55, 103; 430/117, 430/118; 355/256, 257, 258

[56] References Cited

U.S. PATENT DOCUMENTS 3,486,922 12/1969 Cassiers et al. .................. 430/118
3,795,443 3/1974 Heine-Geldern et al. .......... 430/117
4,972,200 11/1990 Arahara et al. .................... 346/1.1
4,982,692 1/1991 Uematsu ......................... 430/117 X
5,175,569 12/1992 Chiba ................................ 347/55

FOREIGN PATENT DOCUMENTS 58-215671 12/1983 Japan .
62-5283 1/1987 Japan .

Primary Examiner—George F. Lesmes
Assistant Examiner—Bernard P. Codd
Attorney, Agent, or Firm—Finnegan, Henderson, Farabow, Garrett & Dunner, L.L.P.

[57] ABSTRACT

The present invention provides a non-contact ink developing method for developing an electrostatic latent image formed on an electrostatic latent image formation member with ink, characterized by employing a conductive ink as the ink and a conductive developing roller disposed close to the electrostatic latent image formation member and whose surface has a water-repellent finish for producing very small ink droplets which are substantially spherical. The method comprising the steps of supplying the conductive ink to the surface of the conductive roller to produce a large number of very small ink droplets, and ejecting the ink droplets toward the electrostatic latent image in a developing area facing the electrostatic latent image formation member by an electrostatic induction force generated by charges of the electrostatic latent image and charges of opposite polarity induced in the ink droplets by the electrostatic latent image, and attaching the droplets to the electrostatic latent image.

7 Claims, 5 Drawing Sheets

NON-CONTACT INK DEVELOPING METHOD USING WATER-REPELLENT SURFACE

This application is a continuation of application Ser. No. 08/137,793 filed Oct. 19, 1993, now abandoned.

BACKGROUND OF THE INVENTION

1. Field of the Invention

The present invention relates to a non-contact ink developing method by which an electrostatic latent image is developed with an ink without contacting it.

2. Discussion of the Related Art

As a method for developing an electrostatic latent image formed on an electrostatic latent image formation member such as an electrostatic recording material or light-sensitive member for electrophotography, the dry developing method using powdered developer and the wet developing method using liquid developer are known.

The wet developing method uses liquid developer consisting of a dispersion medium of high electrical resistivity and toner particles with the opposite charge to the latent image. While bringing the liquid developer in contact with the surface of an electrostatic latent image formation member, the toner particles move by electrophoresis and adhere to the electrostatic latent image to develop it. A fusing process is unnecessary for this method, or even if necessary, a fusing process using a simple fuser is sufficient. Therefore, a compact and inexpensive developing apparatus can be provided compared to an apparatus employing the dry developing method, and moreover, an image of high resolution can be obtained.

However, the wet developing method inevitably uses an organic solvent having flammability and/or volatility as the dispersion medium for the toner particles. Because many organic solvents are toxic to one degree or another, this is undesirable from the viewpoint of safety, and environmental and and health considerations. Furthermore, since the electrostatic latent image formation member is dipped into the liquid developer in the wet developing method, the surface of the electrostatic latent image formation member is gradually contaminated by excess toner particles, which causes attachment of toner to areas other than the electrostatic latent image, and leads to fogging.

To overcome the problems described above, a new developing method has been suggested in which an electrostatic latent image is developed with a liquid ink.

For example, Japanese Patent Application Unexamined Publication No. Sho. 58-215671 (1983) discloses an ink mist developing method which oscillates a liquid ink by an ultrasonic oscillator to generate an ink mist from the surface of the liquid ink and causes the ink mist to agglomerate adjacent to the surface of the electrostatic latent image formation member. In this manner, the ink mist attaches only to the electrostatic latent image by the electrostatic induction force generated by the charge applied to the ink mist from the electrostatic latent image, thus developing the image.

As another developing method using a liquid ink, Japanese Patent Application Unexamined Publication No. Sho. 62-5283 (1987) discloses an ink jet developing method which uses an ink jet developing means having a slit aperture installed close to an electrostatic latent image formation member and equipped with an electrode applying a voltage of an opposite polarity to that of a latent image. A liquid ink is ejected only toward the electrostatic latent image from the slit aperture to develop the latent image. This method makes it possible to record information by a non-contact developing apparatus without using toner or a carrier as the developer.

The conventional ink developing methods described above resolve the problems in the wet developing method, but they have other problems as follows.

In the ink mist developing method, because it is difficult to apply sufficient charge to the ink mist from the electrostatic latent image and agglomerate the ink mist adjacent to the surface of the electrostatic latent image formation member in a stable way, the ink mist cannot attach to the electrostatic latent image selectively and sufficiently. This prevents exact development without fogging, and moreover, it cannot carry out high speed development.

In the ink jet developing method, it is difficult to develop an image with high resolution because of instabilities in the formation of very small ink droplets. Furthermore, the slit aperture must be installed at a narrow spacing, from some tens of micrometers to one hundred micrometers, from the electrostatic latent image formation member, or the slit aperture is apt to become blocked with the passage of time. Accordingly, installation or maintenance of the apparatus is troublesome. In addition, this method has another problem, in that it is unsuitable for performing high speed development.

SUMMARY OF THE INVENTION

The present invention has been made in view of the above circumstances, and has as an object, the provision of a non-contact ink developing method by which a high-quality image of high resolution can be obtained with certainty.

A further object of the present invention is to provide a non-contact ink developing method which performs development as described above at high speed.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the non-contact ink developing method for developing an electrostatic latent image formed on an electrostatic latent image formation member with ink of this invention, is characterized by employing a conductive ink as the ink and a conductive developing roller disposed close to the electrostatic latent image formation member. The surface of the developing roller has a water-repellent finish for producing very small ink droplets which are substantially spherical. The method comprises the steps of supplying the conductive ink to the surface of the conductive roller to produce a large number of very small ink droplets, and ejecting the ink droplets toward the electrostatic latent image in a developing area facing the electrostatic latent image formation member by an electrostatic induction force generated by charges of the electrostatic latent image and charges of opposite polarity induced in the ink droplets by the electrostatic latent image, and attaching the droplets to the electrostatic latent image.

Here, an almost spherical very fine ink droplet means a droplet whose overall shape approximates a sphere and which attaches to the surface of a developing roller at an area as small as possible. Preferably, the diameter of the ink droplet ranges from 10–200 μm.

As the conductive ink of the present invention, an ink comprising of a liquid primarily composed of water with various dyes and so forth dispersed therein may be employed. It is preferable that the surface tension of the conductive ink is at least 50 dyne/cm.

As a means for supplying the surface of the developing roller with the conductive ink, for example, a means for dipping a part of the developing roller into stored liquid ink may be used. In the present invention, the conductive ink supplied to the developing roller spontaneously forms a large number of ink droplets, but the formation of droplets may preferably be assisted by the provision of an ink droplet formation means which will be described later.

The non-contact ink developing method of the present invention is characterized by using a conductive developing roller on which a water-repellent finish is applied so that the contact angle made by the ink droplet to the surface of the developing roller is at least 120°, preferably at least 140° and optimally from 140° to 160°.

Here, the contact angle means the angle including the droplet between the surface of the developing roller and a tangent to the surface of the droplet at the boundary point of the droplet, the roller and the air.

By using such a conductive developing roller to which a water-repellent finish is applied, the ink droplets are completely separated from the surface of the developing roller and ejected toward the electrostatic latent image with high reliability under the effect of the electrostatic induction force generated between the latent image and the very small ink droplets. If the contact angle is less than 120°, the ink droplets are not ejected adequately by the electrostatic induction force, or even if ejected, a part of the ink droplets remains on the surface of the developing roller; therefore the ink does not sufficiently attach to the electrostatic latent image.

In another aspect of the non-contact ink developing method of the present invention, the conductive ink supplied to the developing roller is passed between the developing roller 4 and a blade 5 disposed in contact with the developing roller 4, as shown in FIG. 5, or passed between the developing roller 4, and an elastic roller 6 disposed to rotate while contacting the developing roller 4 as shown in FIG. 7. In this manner the ink droplets 3a are formed on the surface of the developing roller 4, respectively.

By means of such a blade or an elastic roller, and as demonstrated in FIG. 2(a), the conductive ink 3 is first made into a liquid ink film 3b on the surface of the developing roller 4. Then, the ink immediately is caused by the surface tension of the ink and the water-repellency of the surface of the developing roller to form a large number of very small ink droplets which are almost spherical, as seen in FIG. 2(b). In particular, if an elastic roller is employed, it can also supply the ink to the developing roller at the same time.

It is preferable that the thickness of the liquid ink film formed by the blade or elastic roller is within the range from 0.1 μm to 5 μm.

In another aspect of the non-contact ink developing method, as shown in FIG. 8, the conductive ink 3 is vibrated by an ultrasonic oscillator 7 so that ink mist 3c rises from the surface of the conductive ink 3 and attaches to the surface of the developing roller 4, whereby ink droplets 3a are formed on the surface of the developing roller 4.

According to this ink mist method, the conductive ink is supplied as an ink mist to the surface of the developing roller and attached thereto. Immediately after, the ink agglomerates as a result of the surface tension of the ink and water-repellency of the surface of the developing roller to form a large number of very small ink droplets which are almost spherical.

The non-contact ink developing method according to the present invention is also characterized in that a water-repellent surface layer is made so as to obtain the conductive developing roller 4 with a water-repellent finish as shown in FIG. 1. This is performed by plating the roller with a metal having particles of polytetrafluoroethylene, graphite fluoride or an oligomer of tetrafluoroethylene dispersed.

By using a conductive developing roller having a water-repellent surface layer made by plating it with the metal described above, it is possible to form the ink droplets in a desired shape and size. Moreover, the stiffness of the surface of the developing roller is increased, and therefore, the durability and reliability of the formation of the ink droplets are also improved.

As the metal material for the plating described above, nickel, zinc, chromium, copper, tin, solder, gold, silver, palladium, rhodium, and so forth may be used.

The non-contact ink developing method may also use a conductive developing roller 4 having a water-repellent surface layer 8a with projections and recesses thereon whose 10-point average roughness $R_z$ (for 500 μm standard length) ranges from 0.1–5 μm and average spacing of projections and recesses ranges from 0.1–5 μm as shown in FIG. 6.

By using the conductive developing roller equipped having the water-repellent surface layer with projections and recesses, it is possible to form the ink droplets of desired shape more uniformly and lower the adhesion force between the ink droplets and developing roller.

The resistivity of the conductive ink and conductive developing roller used in the non-contact ink developing method is not more than $10^{10}$ Ω.cm, and preferably not more than $10^8$ Ω.cm.

By using a conductive ink and conductive developing roller having a resistivity as described above, induction charges caused by the electrostatic latent image are easily applied to the ink droplets, which enables the droplets to be transferred well. If a conductive ink and conductive developing roller having a resistivity not less than $10^{10}$ Ω.cm are used, the time required for applying the charges to the ink droplets becomes longer, and therefore it is impossible for the ink droplets to be easily transferred.

Any developing roller made of a conductive water-repellent material may be used as the conductive developing roller in the technical means described above.

The water-repellent materials may be broadly classified into silicone or fluorine-based water-repellent materials. As the water-repellent surface layer made of a silicone water-repellent material, examples include a film of silicone mold releasing agent, a baked film or adsorption film of silicone oil or various denatured silicone oils, a film of silicone silane coupling substance, a silicone varnish film, a silicone rubber film, or a compound film of silicone rubber and various metals or rubber, plastics, ceramics, or the like. As the water-repellent surface layer of a fluorine-based water-repellent material, examples include a fluororesin film, a film of organic fluorine compound, a baked film or adsorption film of fluorine oil, a fluororubber film, and a compound film of fluororubber and various metals, rubber, plastics, ceramics, or the like.

In the technical means described above, as the conductive developing roller having a water-repellent surface layer with projections and recesses, an example includes a conductive developing roller having a water-repellent surface on which very small particles whose diameters are sufficiently small so that a desired surface roughness may be obtained are attached with a binder.

The very small particles may include particles of inorganic substances such as metallic oxide, metallic nitride or ceramics, whose diameter ranges from about 0.1 to 10 μm, and preferably from 0.1 to 5 μm. For example, silicon carbide, titanium carbide, boron carbide, tungsten carbide, silica, magnesium oxide, alumina, lead oxide, zinc oxide, boron nitride, silicon nitride, graphite, calcium carbonate, diamond, or ceramics such as glass beads may be used.

For the conductive roller having the water-repellent surface layer with projections and recesses, a roller having a water-repellent surface layer of the thickness of 30 μm or less with projections and recesses formed in accordance with an undercoating layer with projections and recesses of the 10 points average roughness and average period described above may be used.

The undercoating layer can be a roughened surface formed by attaching the above-described very small particles with a binder, or the base material of the developing roller can be roughened by sand blasting or grit blasting.

As shown in FIG. 9, a developing roller on which nuclei for uniform formation of the ink droplets can be employed as the developing roller 4. It is preferable that the number of nuclei per 1 mm$^2$ on the surface of the developing roller ranges from 1 to 500.

To form the nuclei, the critical surface tension of the nucleus portion is made larger than that of a part other than the nucleus portion. For example, a dispersion-metal plated developing roller on which a plurality of very small spots are irradiated with a converging laser beam and dispersion particles appearing at the surface of the spots are melted may be employed. Very small recesses mechanically formed on the surface of the developing roller may also be sufficient as the nuclei for formation of the ink droplets.

By forming such nuclei, because the ink on the surface of the developing roller coheres around the nuclei as shown in FIG. 9, the ink droplets 3a are always formed stably.

According to the present invention, as shown in FIG. 3(a), the conductive ink supplied to the conductive developing roller 4 with a surface having water-repellent finish is transformed into a large number of very small ink droplets 3a which are approximately spherical on the surface of the roller. In a developing area A facing the electrostatic latent image formation member 1, induction charges having an opposite polarity to the charge of the latent image are applied to the ink droplets by the electrostatic latent image 2, thus generating an electrostatic induction force between the ink droplets and latent image. Since the very small ink droplets attaching to the developing roller are approximately spherical, the adhesion force at the interface of the ink and the surface of the developing roller is extremely small. The relationship between the adhesion and above-described electrostatic induction force is maintained in accordance with the following expression:

(electrostatic induction force caused by charge of the latent image) ≧ (adhesion force of the ink droplets)

As a result, the ink droplets 3a described above are swelled by the electrostatic induction force F as shown in FIG. 3(b), and when the electrostatic induction force exceeds the adhesion force, the ink droplets are separated from the surface of the developing roller 4 and are ejected toward the electrostatic latent image 2, thus attaching to the latent image as shown in FIG. 3(c). In this way the non-contact development is performed.

At this time all of the ink droplets are ejected and attached to the electrostatic latent image without exception. The ink droplets which have not been consumed in the developing area are restored to the liquid ink. The spacing between the developing roller and the electrostatic latent image formation member in the present invention is normally in the range from 300 to 1000 μm.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Preferred embodiments of a non-contact ink developing method according to the present invention are now described in detail based on the drawings.

First Embodiment

Figure 1:
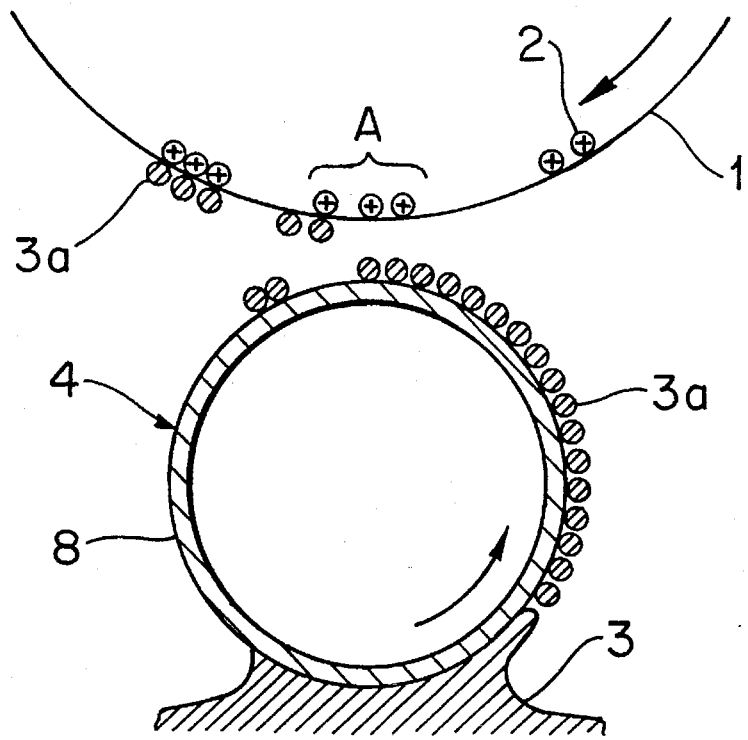
FIG. 1 shows the construction of a non-contact type ink developing method according to the present invention.
Figure 2A:
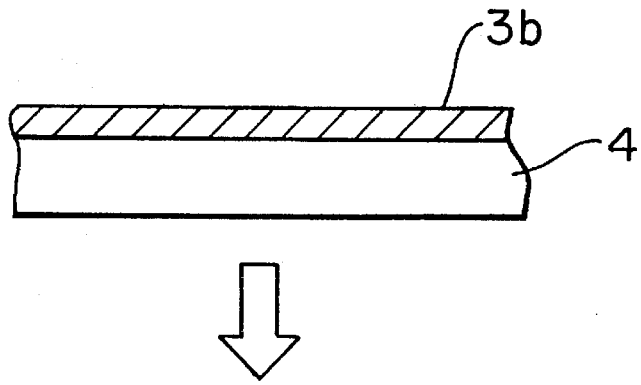
FIGS. 2(a)–2(b) show a process of formation of ink droplets.
Figure 2B:
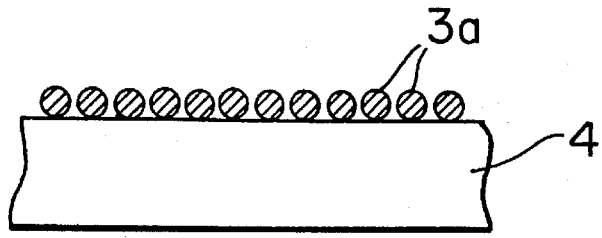
Figure 3A:
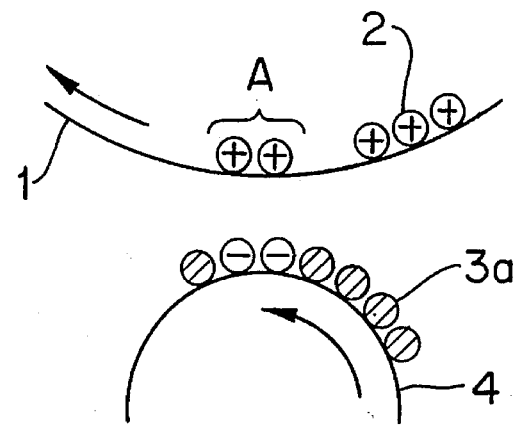
FIGS. 3(a)–(c) show the principle of development in the present invention.
Figure 3B:
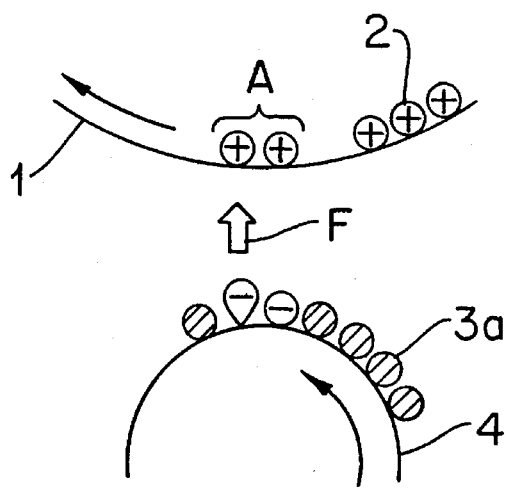
Figure 3C:
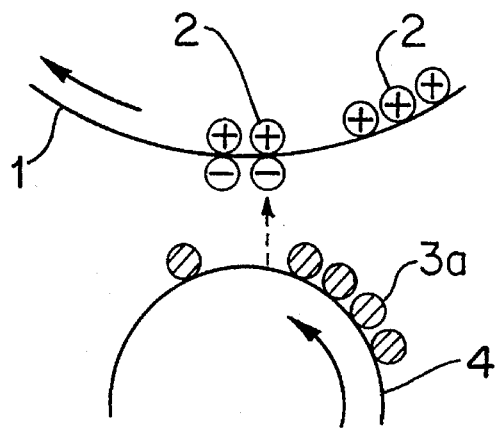
Figure 4:
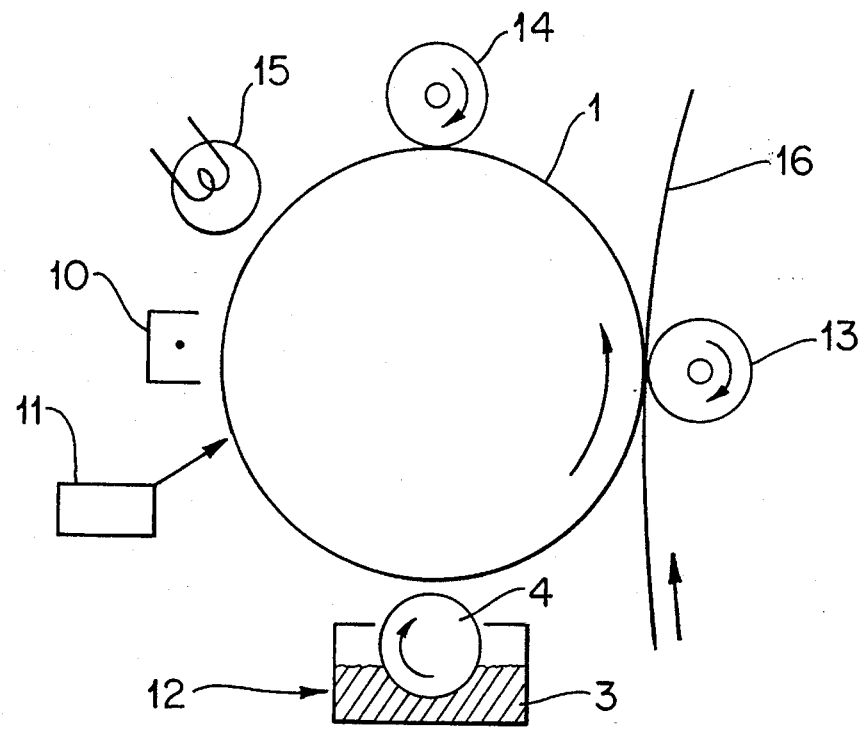
FIG. 4 shows the whole construction of an image formation apparatus employing an ink developing apparatus according to the developing method of the present invention.
Figure 5:
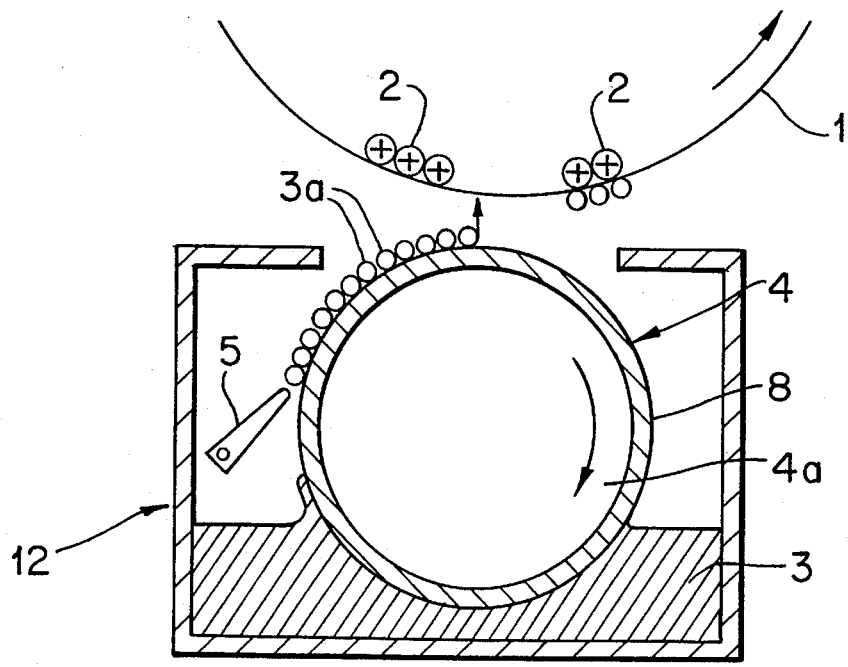
FIG. 5 is a schematic sectional view showing a first embodiment of an ink developing apparatus according to the present invention.
Figure 6:
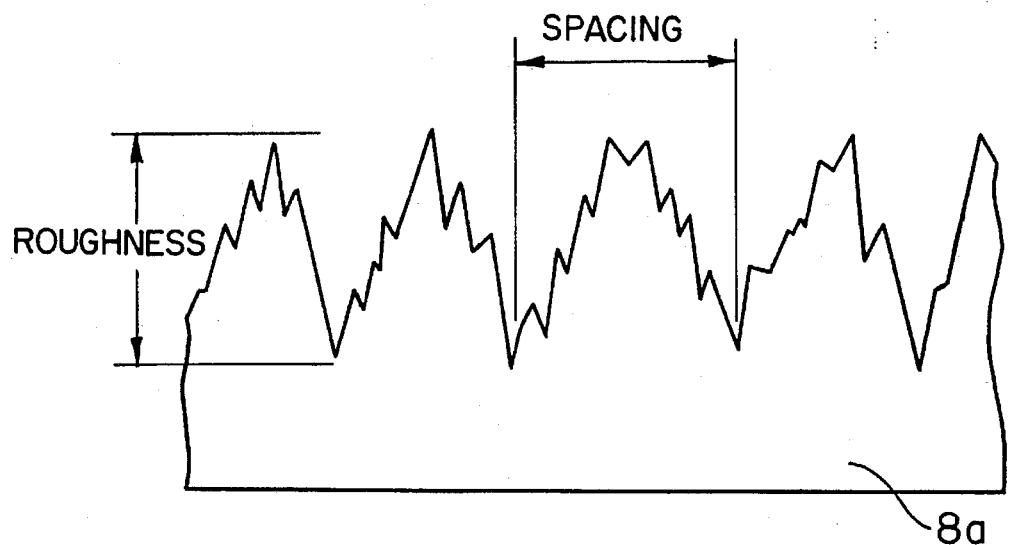
FIG. 6 is an enlarged view showing a roughened surface of the water-repellent surface layer in the developing roller.

FIGS. 4 through 6 show a first embodiment according to the present invention. FIG. 4 shows the whole construction of an image formation apparatus, such as a copying machine, employing a developing method according to the present invention; FIG. 5 is a schematic sectional view showing an ink developing apparatus according to the ink developing method of the present invention; and FIG. 6 is an enlarged view showing a developing roller with a surface layer to which a water-repellent finish is applied.

The image formation apparatus has a selenium light-sensitive drum 1 as an electrostatic latent image formation member and around it are installed a charger 10, an exposure means 11 which irradiates the light-sensitive drum 1 with a laser beam or the like corresponding to image information, an ink developing apparatus 12, a transfer roller 13 for transferring an ink image under appropriate pressure, a cleaner 14 and an erase lamp 15 in this order. In the figure, 16 shows a recording medium. The light-sensitive drum 1 rotates with a surface speed of 100 mm/s, and after the entire surface is charged to be positive, an electrostatic latent image with a dark portion potential of 750 V and light portion potential of 150 V is formed on the surface of the drum 1.

The ink developing apparatus 12 comprises, as shown in FIG. 5, a conductive developing roller 4 with a water-repellent surface layer 8 disposed close to the light-sensitive drum 1. Part of the developing roller 4 is dipped into the conductive ink 3, and a blade 5 is provided in contact with the surface of the developing roller 4.

The developing roller 4 is made by roughening the surface of an aluminum base roller 4a by a dry blasting method using a No. 1000 abrasive and covering the surface with a water-repellent layer 8a formed by a plating of with nickel containing dispersed fine particles of polytetrafluoroethylene. As shown in FIG. 6, the surface of the developing roller 4 (water-repellent layer 8a) has a 10-point average roughness $R_z$ of 1.2 μm (for 500 μm standard length) and the spacing of projections and recesses is 1.5 μm.

The blade 5 is an elastic blade made of polyurethane and the cross-section of the top of the blade is a semicircle of 200 μm diameter, which contacts the developing roller 4 with a pressing force of 5 g/cm. The diameter of the ink droplets 3a can be controlled by adjusting the pressing force of the blade and curvature of the top portion of the blade.

The conductive ink 3 supplied to the surface of the developing roller 4 (55 dyne/cm surface tension) is turned into a liquid ink film of 2.5 μm average thickness by the blade 5, and after some tens or hundreds of milliseconds, the ink coalesces and changes to the ink droplets 3a of 30 μm particle diameter. The contact angle of an ink droplet 3a to the developing roller 4 is about 140°. At that time, the resistivities of the conductive ink 3 and the surface of the developing roller 4 are in the range from 1 to 10 Ω.cm and from $10^5$ to $10^6$ Ω.cm, respectively.

Figure 9:
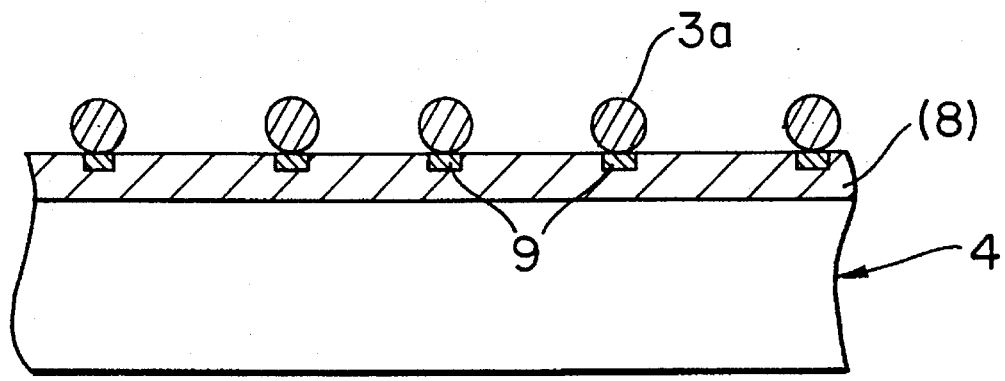
FIG. 9 shows a developing roller having nuclei for formation of the ink droplets.

As seen in FIG. 9, by locally discharging the surface of the above-described developing roller 4 with stylus pins for imparting high surface energy only to the discharged portions, nuclei 9 for ink droplet formation are formed on the surface at the rate of 16 nuclei per 1 $mm^2$, namely, one nucleus per 250-μm square. Investigation of the ink droplet formation state when the nuclei are used shows that ink droplets of about 30 μm particle diameter are formed on the surface of the developing roller 4 corresponding to the nuclei 9 at the rate of 16 nuclei per 1 $mm^2$.

When the surface rotation speed of the developing roller 4 is 200 mm/s, $10^6$ ink droplets are formed in a second. It is almost impossible for a conventional slit ink jet developing means to stably produce the fine ink droplets of 30 μm particle diameter at the rate of $10^6$ ink droplets per second.

The operation of the image formation apparatus adopting the above-described ink developing apparatus is now explained.

The light-sensitive drum 1 is charged by the charger 10 as shown in FIG. 4, and after that the exposing means 11 exposes the light-sensitive drum 1 in accordance with image information, thus forming the electrostatic latent image. The latent image on the light-sensitive drum 1 is developed by the ink developing apparatus 12. That is, as shown in FIG. 5, the conductive ink 3 supplied to the developing roller 4 is turned into a liquid ink film by the blade 5 and immediately changes to ink droplets 3a, and then negative induction charges are imparted to the ink droplets 3a in the developing area. Accordingly, the ink droplets 3a are moved toward the electrostatic latent image 2 by an electrostatic induction force between the latent image 2 and ink droplets 3a themselves and attach to the latent image 2.

After the development, a recording sheet as the recording medium 16 is transported in the transfer area between the light-sensitive drum 1 and transfer roller 13, and pressed against the light-sensitive drum 1 by the transfer roller 13, whereby the ink image formed in the developing process is transferred to the recording sheet (the recording medium 16). Thus the image formation is completed.

Since the ink image transferred to the recording sheet penetrates and naturally fuses into the sheet, a special fuser is unnecessary for this image formation apparatus.

Residual ink on the light-sensitive drum 1 is removed by the cleaner 14 and the electrostatic latent image is discharged and erased by the erase lamp 15. Then, the next image formation can be conducted by repeating the above-described operation.

Here, the state of the development by this embodiment of the ink developing apparatus according to the present invention was examined with variation in the contact angle of the ink droplets and potential of the electrostatic latent image. The conditions for the development are the same as described above except for the following:

Spacing between the developing roller 4 and light-sensitive drum 1: 0.5 mm

Conductive ink 3: water-color ink, viscosity 1 cp, surface tension 55 dyne/cm

Particle diameter of the ink droplets: 200 μm.

Table 1 shows the result of the experiment, where ** indicates that the ink droplets are separated from the surface of the developing roller and are transferred well and * indicates that the ink droplets swell on the surface of the developing roller, but are not separated.

TABLE 1

| | Contact angle of the ink droplets(°) | | | | | | |
|---|---|---|---|---|---|---|---|
| | 100 | 110 | 120 | 130 | 140 | 150 | 160 |
| Electric field | 0.5 | * | * | * | * | ** | ** | ** |
| of the | 0.7 | * | * | * | ** | ** | ** | ** |
| charge of the | 1.0 | * | * | * | ** | ** | ** | ** |
| electrostatic | 2.0 | * | * | * | ** | ** | ** | ** |
| latent image (kV/mm) | 3.0 | * | * | ** | ** | ** | ** | ** |

Second Embodiment

Figure 7:
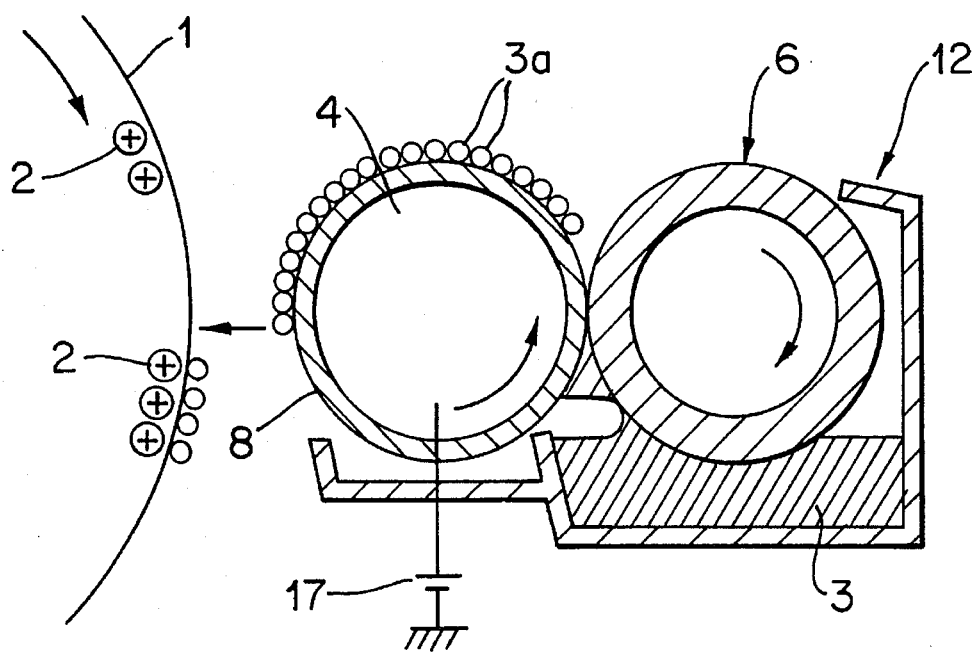
FIG. 7 is a schematic sectional view showing a second embodiment of an ink developing apparatus according to the present invention.

FIG. 7 is a schematic sectional view showing another embodiment of the ink developing apparatus according to the present invention which may be used in place of the first embodiment of the ink developing apparatus. The construction of the ink developing apparatus 12 in this embodiment is the same as that of the first embodiment except in that an elastic roller 6 is employed in place of the blade 5. The elastic roller 6 which consists of a metal core and a silicone rubber layer around it and is arranged to rotate in contact with the developing roller 4 with a pressing force of 3 kg.

The developing roller 4 is installed with a spacing of 0.3 mm from the light-sensitive drum 1, and a developing bias voltage of 20 V is applied to the developing roller 4 by a power supply 17.

By means of the developing apparatus described above, development is performed in almost the same way as the first embodiment, except the ink droplets 3a are formed on the developing roller 4 by the elastic roller 6.

In this embodiment, since a developing bias voltage of 250 V is applied to the developing roller 4, an electrostatic field of 1700 V/mm acts on the ink droplets 3a in the dark portions (750 V potential) on the light-sensitive drum 1; therefore negative induction charges are imparted.

Third Embodiment

Figure 8:
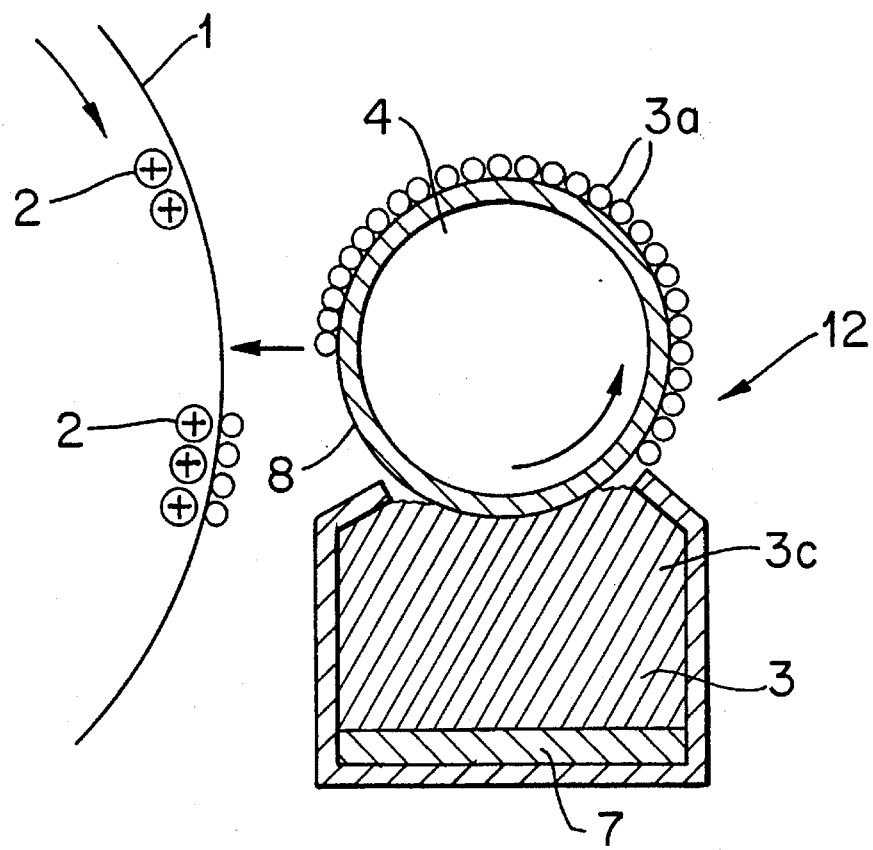
FIG. 8 is a schematic sectional view showing a third embodiment of an ink developing apparatus according to the present invention.

FIG. 8 is a schematic sectional view showing another embodiment of the ink developing apparatus according to the present invention which may replace the first embodiment. The construction of the ink developing apparatus 12 is the same as that of the first embodiment except in that the ink droplets 3a are formed by the ink mist method instead of using the blade 5. That is, the ink developing apparatus 12 includes an ultrasonic oscillator 7 in an ink reservoir and produces ink mist 3c from the surface of the conductive liquid ink 3 by operating the ultrasonic oscillator. The ink mist 3c is disposed to agglomerate close to the surface of the developing roller 4.

According to the above-described ink developing apparatus, development is performed in almost the same way as the first embodiment, except the ink droplets 3a on the developing roller 4 are formed from the ink mist 3c.

As described above, the ink developing method according to the present invention uses a conductive ink and conductive developing roller having a surface with a water-repellent finish. The developing roller is installed close to the electrostatic latent image formation member, for ejecting a large number of the fine ink droplets formed on the developing roller toward the electrostatic latent image by the electrostatic induction force generated between the ink droplets and the latent image, thus carrying out the development. Therefore, a large number of very small ink droplets can be obtained stably and quickly, and moreover, those ink droplets can be ejected only to the electrostatic latent image reliably from a position adjacent to the electrostatic latent image formation member.

Consequently, in accordance with the present invention, it is possible to stably carry out excellent development performance at high speed, which provides a high quality image having fine details due to high resolution without problems such as contamination of the electrostatic latent image formation member or fogging.

Moreover, by formation of the ink droplets having a specific contact angle and by using the conductive ink and conductive developing roller of specified resistivities, the ink droplets can be ejected with more reliability and stability.

Furthermore, the ink droplets can be formed more quickly and stably by employing an ink droplet formation means such as a blade, an elastic roller or an ink mist method, or by using a developing roller with a special water-repellent surface layer.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A non-contact ink developing method for developing an electrostatic latent image formed on an electrostatic latent image formation member with ink, the developing method comprising the steps of:

selecting a conductive liquid ink as said ink;

disposing a conductive developing roller proximate to said electrostatic latent image formation member, the conductive developing roller having a surface provided with a water-repellent finish for producing ink droplets which are substantially spherical in shape on the water-repellant finish of the surface, wherein the conductive ink and the conductive developing roller each have a resistivity of $10^{10}$ $\Omega$.cm or less;

supplying said conductive liquid ink to the surface of said conductive developing roller to produce a plurality of said ink droplets on the water-repellent finish of the surface, wherein the water-repellant finish provided on the surface of said conductive developing roller produces ink droplets having a contact angle relative to the surface of said conductive developing roller of at least 120°; and ejecting said ink droplets toward said electrostatic latent image in a developing area facing said electrostatic latent image formation member by an electrostatic induction force generated by charges of said electrostatic latent image and charges of opposite polarity induced in said ink droplets by said electrostatic latent image, such that said ink droplets attach to said electrostatic latent image.

2. A non-contact ink developing method according to claim 1, wherein the supplying step includes passing said conductive ink between said conductive developing roller and a blade disposed in contact with said conductive developing roller prior to producing said ink droplets on the surface of said conductive developing roller.

3. A non-contact ink developing method according to claim 1, wherein the supplying step includes passing said conductive ink between said conductive developing roller and an elastic roller rotating in contact with said conductive developing roller prior to producing said ink droplets on the surface of said conductive developing roller.

4. A non-contact ink developing method according to claim 1, wherein the supplying step includes generating an ink mist from a surface of a conductive ink reservoir by vibrating said conductive ink reservoir with an ultrasonic oscillator, such that said ink mist attaches to the surface of said conductive developing roller prior to being produced into said ink droplets.

5. A non-contact ink developing method according to claim 1, wherein the water-repellent finish of said conductive developing roller is provided by a water-repellent surface layer made of a dispersion metal plating in which particles selected from a group consisting of polytetrafluoroethylene, graphite fluoride, and an oligomer of tetrafluoroethylene are dispersed.

6. A non-contact ink developing method according to claim 1, wherein said water-repellent finish of said conductive developing roller has a 10-point average roughness $R_z$ of from 0.1 to 5 µm and an average spacing between projections and recesses of from 0.1 to 5 µm.

7. A non-contact ink developing method according to claim 1 further comprising the step of forming nuclei on the surface of the conductive developing roller to locate the ink droplets to be produced on the water-repellent finish of the surface.

* * * * *

UNITED STATES PATENT AND TRADEMARK OFFICE
CERTIFICATE OF CORRECTION

PATENT NO. : 5,622,805
DATED : April 22, 1997
INVENTOR(S) : Yasuhiro UEHARA et al.

It is certified that error appears in the above-indentified patent and that said Letters Patent is hereby corrected as shown below:

Claim 1, Column 10, Line 15, "$\Omega.cm$" should read --$\Omega\cdot cm$--.

Signed and Sealed this

Nineteenth Day of August, 1997

*Attest:*

BRUCE LEHMAN

*Attesting Officer*   *Commissioner of Patents and Trademarks*